(12) United States Patent
Xu

(10) Patent No.: US 7,497,942 B2
(45) Date of Patent: Mar. 3, 2009

(54) CATALYST ADDITIVES FOR THE REMOVAL OF $NH_3$ AND HCN

(75) Inventor: Mingting Xu, Edison, NJ (US)

(73) Assignee: BASF Catalysts, LLC, Florham Park, NJ (US)

( * ) Notice: Subject to any disclaimer, the term of this patent is extended or adjusted under 35 U.S.C. 154(b) by 901 days.

(21) Appl. No.: 10/456,400

(22) Filed: Jun. 6, 2003

(65) Prior Publication Data

US 2004/0245148 A1    Dec. 9, 2004

(51) Int. Cl.
C10G 11/00    (2006.01)
B01J 38/12    (2006.01)

(52) U.S. Cl. ............. 208/113; 208/120.01; 208/120.35; 423/239.2; 502/38; 502/241

(58) Field of Classification Search ................ 208/113, 208/120.01, 120.35; 423/239.2; 502/241, 502/38
See application file for complete search history.

(56) References Cited

U.S. PATENT DOCUMENTS

| | | | |
|---|---|---|---|
| 3,922,235 A | 11/1975 | DeLuca et al. | |
| 3,951,860 A | 4/1976 | Acres et al. | |
| 4,039,622 A | 8/1977 | Murrell et al. | |
| 4,072,600 A | 2/1978 | Schwartz et al. | |
| 4,088,568 A | 5/1978 | Schwartz | |
| 4,107,032 A | 8/1978 | Chester | |
| 4,115,250 A | 9/1978 | Flanders et al. | |
| 4,117,081 A | 9/1978 | Inaba et al. | |
| 4,148,751 A | 4/1979 | Hemler et al. | |
| 4,181,600 A | 1/1980 | Chester | |
| 4,199,435 A | 4/1980 | Chessmore et al. | |
| 4,290,878 A | 9/1981 | Blanton | |
| 4,300,997 A | 11/1981 | Meguerian et al. | |
| 4,544,645 A | 10/1985 | Klaassen et al. | |
| 4,744,962 A | 5/1988 | Johnson et al. | |
| 4,755,282 A * | 7/1988 | Samish et al. | 208/113 |
| 5,173,278 A | 12/1992 | Marler et al. | |
| 5,240,690 A | 8/1993 | Tang et al. | |
| 5,364,517 A | 11/1994 | Dieckmann et al. | |
| 5,372,706 A | 12/1994 | Buchanan et al. | |
| 5,382,352 A | 1/1995 | Hansen et al. | |
| 5,552,128 A | 9/1996 | Chang et al. | |
| 5,705,053 A | 1/1998 | Buchanan | |
| 5,716,514 A | 2/1998 | Buchanan | |
| 5,830,346 A | 11/1998 | Harandi et al. | |
| 6,372,686 B1 | 4/2002 | Golden | |
| 6,660,683 B1 | 12/2003 | Yaluris et al. | |

FOREIGN PATENT DOCUMENTS

WO    WO 2004/037420 A1    5/2004

OTHER PUBLICATIONS

M. Shelef and H.S. Gandhi, "The Reduction of Nitric Oxide in Automobile Emissions." Plat Met. Rev. 18, 2(1974).
M. Shelef, "Nitric Oxide: Surface Reactions and Removal from Auto Exhaust." Catal rev.—Sci. Eng., 11(1), 1-40 (1975).
Patent List from International Search Report.

* cited by examiner

*Primary Examiner*—Glenn Caldarola
*Assistant Examiner*—Prem C. Singh
(74) *Attorney, Agent, or Firm*—Raymond F. Keller

(57) ABSTRACT

In the regeneration of a cracking catalyst in a regeneration zone operated in a partial combustion mode, $NH_3$ and HCN in the regenerator flue gas are reduced by incorporating into the regenerator precious metals such as ruthenium, rhodium, iridium, or mixtures thereof.

18 Claims, No Drawings

CATALYST ADDITIVES FOR THE REMOVAL OF $NH_3$ AND HCN

FIELD OF THE INVENTION

This invention relates to regeneration of spent catalyst in a fluid catalytic cracking (FCC) process and the reduction of $NH_3$ and HCN from the regenerator that is operated in an incomplete mode of CO combustion.

BACKGROUND OF THE INVENTION

Catalytic cracking of heavy petroleum fractions is one of the major refining operations employed in the conversion of crude petroleum oils to useful products such as the fuels utilized by internal combustion engines. In fluidized catalytic cracking processes, high molecular weight hydrocarbon liquids and vapors are contacted with hot, finely-divided, solid catalyst particles, either in a fluidized bed reactor or in an elongated transfer line reactor, and maintained at an elevated temperature in a fluidized or dispersed state for a period of time sufficient to effect the desired degree of cracking to lower molecular weight hydrocarbons of the kind typically present in motor gasoline and distillate fuels.

In the catalytic cracking of hydrocarbons, some non-volatile carbonaceous material or coke is deposited on the catalyst particles. Coke comprises highly condensed aromatic hydrocarbons and generally contains from about 4 to about 10 weight percent hydrogen. When the hydrocarbon feedstock contains organic sulfur and nitrogen compounds, the coke also contains sulfur and nitrogen species. As coke accumulates on the cracking catalyst, the activity of the catalyst for cracking and the selectivity of the catalyst for producing gasoline-blending stocks diminishes.

Catalyst which has become substantially deactivated through the deposit of coke is continuously withdrawn from the reaction zone. This deactivated catalyst is conveyed to a stripping zone where volatile deposits are removed with an inert gas at elevated temperatures. The catalyst particles are then reactivated to essentially their original capabilities by substantial removal of the coke deposits in a suitable regeneration process. Regenerated catalyst is then continuously returned to the reaction zone to repeat the cycle.

Catalyst regeneration is accomplished by burning the coke deposits from the catalyst surfaces with an oxygen containing gas such as air in a regenerator separate from the fluidized reactor used in catalytic cracking. In the catalyst regenerator, the coke burns off, restoring catalyst activity and heating the catalyst to, e.g., 500-900° C., usually 600-750° C. Flue gas formed by burning coke in the regenerator may be treated to remove particulates and convert carbon monoxide, after which the flue gas is normally discharged into the atmosphere.

The removal of carbon monoxide from the waste gas produced during the regeneration of deactivated cracking catalyst can be accomplished by conversion of the carbon monoxide to carbon dioxide in the regenerator or carbon monoxide boiler after separation of the regeneration zone effluent gas from the catalyst.

Initially, there was little incentive to attempt to remove substantially all coke carbon from the catalyst, since even a fairly high carbon content had little adverse effect on the activity and selectivity of amorphous silica-alumina catalysts. Most of the FCC cracking catalysts now used, however, contain zeolites, or molecular sieves. Zeolite-containing catalysts have usually been found to have relatively higher activity and selectivity when their coke carbon content after regeneration is relatively low. An incentive arose for attempting to reduce the coke content of regenerated FCC catalyst to a very low level.

When the regenerators operate in a complete CO combustion mode, the mole ratio of $CO_2/CO$ is at least 10 in the regenerator flue gas. During regeneration operated at complete combustion mode, several methods have been suggested for burning substantially all carbon monoxide to carbon dioxide to avoid air pollution, recover heat, and prevent afterburning. Among the procedures suggested for use in obtaining complete carbon monoxide combustion in an FCC regeneration have been: (1) increasing the amount of oxygen introduced into the regenerator relative to standard regeneration; and either (2) increasing the average operating temperature in the regenerator or (3) including various carbon monoxide oxidation promoters in the cracking catalyst to promote carbon monoxide burning. Various solutions have also been suggested for the problem of afterburning of carbon monoxide, such as addition of extraneous combustibles or use of water or heat-accepting solids to absorb the heat of combustion of carbon monoxide.

Specific examples of treatments applied to regeneration operated in the complete combustion mode include the addition of a CO combustion promoter metal to the catalyst or to the regenerator. For example, U.S. Pat. No. 2,647,860 proposed adding 0.1 to 1 weight percent chromic oxide to a cracking catalyst to promote combustion of CO. U.S. Pat. No. 3,808,121 taught using relatively large-sized particles containing CO combustion-promoting metal into a regenerator. The small-sized catalyst is cycled between the cracking reactor and the catalyst regenerator while the combustion-promoting particles remain in the regenerator. Also, U.S. Pat. Nos. 4,072,600 and 4,093,535 teach the use of Pt, Pd, Ir, Rh, Os, Ru, and Re in cracking catalysts in concentrations of 0.01 to 50 ppm, based on total catalyst inventory to promote CO combustion in a complete burn unit. Most FCC units now use a Pt CO combustion promoter. While the use of combustion promoters such as platinum reduce CO emissions, such reduction in CO emissions is usually accompanied by an increase in nitrogen oxides (NOx) in the regenerator flue gas.

It is difficult in a catalyst regenerator to completely burn coke and CO without increasing the NOx content of the regenerator flue gas. Many jurisdictions restrict the amount of NOx that can be in a flue gas stream discharged to the atmosphere. In response to environmental concerns, much effort has been spent on finding ways to reduce NOx emissions.

For example, NOx is controlled in the presence of a platinum-promoted complete combustion regenerator in U.S. Pat. No. 4,290,878, issued to Blanton. Recognition is made of the fact that the CO promoters result in a flue gas having an increased content of nitrogen oxides. These nitrogen oxides are reduced or suppressed by using, in addition to the CO promoter, a small amount of an iridium or rhodium compound sufficient to convert NOx to nitrogen and water.

U.S. Pat. No. 4,300,997 to Meguerian et. al discloses the use of a promoter comprising palladium and ruthenium to promote the combustion of CO in a complete CO combustion regenerator without simultaneously causing the formation of excess amounts of NOx. The ratio of palladium to ruthenium is from 0.1 to about 10.

As opposed to complete CO combustion, older FCC catalyst regeneration techniques are operated in an incomplete mode of combustion or in "partial burn" units. This invention is concerned with such modes of operation rather than the complete CO combustion mode described immediately above. Incomplete CO combustion modes of operation are usually referred to as "standard regeneration" wherein a relatively large amount of coke is left on the regenerated catalyst which is passed from an FCC regeneration zone to an FCC reaction zone. The relative content of CO in the regenerator flue gas is relatively high, i.e., about 1 to 10 volume percent. The concentration of carbon is approximately 0.25 to 0.45 weight percent relative to the regenerated catalyst. Under incomplete combustion operation NOx is not observed in the regenerator flue gas, but sizable amounts of ammonia and HCN are present in the flue gas. According to U.S. Pat. No. 4,744,962, the regenerator flue gas formed under incomplete combustion typically comprises about 0.1-0.4% $O_2$, 15% $CO_2$, 4% CO, 12% $H_2O$, 200 ppm $SO_2$, 500 ppm $NH_3$, and 100 ppm HCN. If the ammonia and HCN are allowed to enter a CO boiler, much of the ammonia and HCN will be converted to NOx.

SUMMARY OF THE INVENTION

The present invention is directed to a catalyst additive and use therefore for reducing $NH_3$ and HCN in an FCC regenerator that is run at less than complete CO combustion mode, i.e., with CO in the range of about 1 to 10 volume percent of the regenerator flue gas. It is believed that an effective FCC additive for the removal of $NH_3$ and HCN from the flue gas of an FCC regenerator run as a partial burn unit can be active for $NH_3$ and HCN removal under the net reducing conditions found in the regenerator. In accordance with this invention, an FCC additive for reducing $NH_3$ and HCN thereof in a regenerator run under an incomplete CO combustion comprises precious metals such as rhodium, iridium, or ruthenium. These precious metal catalysts are very active and selective for the removal of $NH_3$ and HCN to $N_2$ in the presence of steam and carbon monoxide. The precious metals Rh, Ru, and Ir can be present as particulate solids comprising (1) at least a portion of the FCC catalyst particles, (2) a separate particulate solid physically admixed with the FCC catalyst particles and circulating in the inventory of particulate solids, or (3) a separate particulate solid retained in the regeneration zone.

DETAILED DESCRIPTION OF THE INVENTION

The present invention is used in connection with a fluid catalyst cracking process for cracking hydrocarbon feeds. The same hydrocarbon feeds normally processed in commercial FCC systems may be processed in a cracking system employing the present invention. Suitable feedstocks include, for example, petroleum distillates or residuals, either virgin or partially refined. Synthetic feeds such as coal oil and shale oils are also suitable. Suitable feedstocks normally boil in the range from about 200-600° C. or higher. A suitable feed may include recycled hydrocarbons which have already been subjected to cracking.

The catalytic cracking of these petroleum distillates, which are relatively high molecular weight hydrocarbons, results in the production of lower molecular weight hydrocarbon products. The cracking is performed in the catalytic cracking reactor which is separate and distinct from the catalyst regeneration zone. The cracking is performed in a manner in cyclical communication with a catalyst regeneration zone, commonly called a regenerator. Catalysts suitable in this type of catalytic cracking system include siliceous inorganic oxides, such as silica, alumina, or silica-containing cracking catalysts. The catalyst may, for example, be a conventional non-zeolitic cracking catalyst containing at least one porous inorganic oxide, such as silica, alumina, magnesia, zirconia, etc., or a mixture of silica and alumina or silica and magnesia, etc., or a natural or synthetic clay. The catalyst may also be a conventional zeolite-containing cracking catalyst including a crystalline aluminosilicate zeolite associated with a porous refractory matrix which may be silica-alumina, clay, or the like. The matrix generally constitutes 50-95 weight percent of the cracking catalyst, with the remaining 5-50 weight percent being a zeolite component dispersed on or embedded in the matrix. The zeolite may be rare earth-exchanged, e.g., 0.1 to 10 wt % RE, or hydrogen-exchanged. Conventional zeolite-containing cracking catalysts often include an X-type zeolite or a Y-type zeolite. Low (less than 1%) sodium content Y-type zeolites are particularly useful. All zeolite contents discussed herein refer to the zeolite content of the makeup catalyst, rather than the zeolite content of the equilibrium catalyst, or E-Cat. Much crystallinity is lost in the weeks and months that the catalyst spends in the harsh, steam filled environment of modern FCC regenerators, so the equilibrium catalyst will contain a much lower zeolite content by classical analytic methods. Most refiners usually refer to the zeolite content of their makeup catalyst. As will be apparent to those skilled in the art, the composition of the catalyst particles employed in the system is not a critical feature of the present method and, accordingly any known or useful catalyst is acceptable in this invention.

The catalyst inventory may contain one or more additives present as separate additive particles or mixed in with each particle of the cracking catalyst. Additives are sometimes used to enhance octane (medium pore size zeolites, sometimes referred to as shape selective zeolites, i.e., those having a Constraint Index of 1-12, and typified by ZSM-5, and other materials having a similar crystal structure).

It is desirable to separate the hydrocarbon products from the catalyst immediately after cracking. For this reason, a stripping zone is usually placed intermediate to the cracking reactor and the regenerator to cause quick or rapid disengagement of the hydrocarbon products from the catalyst. The stripping zone is maintained at a temperature of about 300° C. to about 600° C. and usually has an inert gas such as steam or nitrogen to aid the stripping.

The cracking conditions generally employed during the conversion of the higher molecular weight hydrocarbons to lower molecular weight hydrocarbons include a temperature of from about 425° C. to about 600° C. The average amount of coke deposited on the surface of the catalyst is between 0.5 weight percent and 2.5 weight percent depending on the composition of the feed material. Rapid disengagement after cracking is again achieved via the stripping zone. Again, conditions for cracking may vary depending on the refiner, feed composition, and products desired. The particular cracking parameters are not critical to the invention which contemplates successful removal of $NH_3$ and HCN from the regenerator over a widely varying range of cracking conditions.

Catalyst passed from the stripping zone to the catalyst regeneration zone will undergo regeneration in the presence of oxygen in the catalyst regeneration zone. This zone usually includes a lower dense bed of catalyst having a temperature of about 500° C. to 750° C. and a surmounted dilute phase of catalyst having a temperature of from about 500° C. to about 800° C. In order to remove the coke from the catalyst, oxygen is supplied in a stoichiometric or substoichiometric relationship to the coke on the spent catalyst. This oxygen may be added by means of any suitable sparging device in the bottom of the regeneration zone or, if desired, additional oxygen can be added in the dilute phase of the regeneration zone surmounted to the dense phase of catalyst. In this invention it is not necessary to provide an over-stoichiometric quantity of oxygen to operate the regeneration zone in a complete combustion mode as is currently in fashion in many FCC units. In fact, this invention concerns a regeneration zone operated in a standard mode of operation which comprises a partial combustion mode or sometimes referred to as a reducing mode wherein the quantity of carbon monoxide in the regeneration zone is maintained at a level of from about 1 to 10 percent by volume of the regenerator flue gas.

Although most regenerators are controlled primarily by adjusting the amount of regeneration air added, other equivalent control schemes are available which keep the air constant and change some other condition. Constant air rate, with changes in feed rate changing the coke yield, is an acceptable way to modify regenerator operation. Constant air, with variable feed preheat, or variable regenerator air preheat, are also acceptable. Finally, catalyst coolers can be used to remove heat from a unit. If a unit is not generating enough coke to stay in heat balance, torch oil, or some other fuel may be burned in the regenerator.

When the regeneration zone is operated in a partial mode of combustion, the off gas stream contains a sizable amount of ammonia ($NH_3$) and HCN. The amount of ammonia, for example, may range from about 10 parts per million to 10,000 parts per million, depending on the composition of the feed material. After requisite separation from the regenerated catalyst, the flue gas stream is passed to a CO boiler where CO is converted to $CO_2$ in the presence of oxygen and, if desired, a catalytic agent. If the ammonia and HCN are allowed to enter the CO boiler, much of it then usually becomes converted to a NOx during the CO oxidation to $CO_2$.

In accordance with the present invention, an additive is provided in the regenerator to remove the ammonia and HCN gas which is formed so as to prevent the formation of NOx in the downstream CO boiler. The additive is particularly useful in regeneration units which are run under partial combustion conditions. The additive comprises ruthenium, rhodium, iridium, or mixtures thereof contained within an attrition-resistant particulate support. The ruthenium, rhodium, or iridium $NH_3$ and HCN reducing particles may be in a form suitable for circulation in the circulating particulate solids inventory in a cracking system or may be in a form which remains within the catalyst regeneration zone. The ruthenium, rhodium, or iridium-containing $NH_3$ and HCN reducing metals may be associated with at least one of the following particulate carriers: (1) all or a portion of the catalyst particles circulating in a cracking system; (2) a particulate solid other than the catalyst such as a finely divided, porous inorganic oxide; (3) particles which, because of physical properties, remain in the catalyst regenerator at all times, rather than circulating with the catalyst particles. Preferably, the $NH_3$ and HCN reducing particles form a separate, but admixed part of the circulating particulate solids inventory.

The $NH_3$ and HCN reducing ruthenium, rhodium, or iridium, including mixtures of these metals, can be employed in an FCC system in association with discrete, promoted particulate solids, which are physically admixed with and circulated in the FCC system with the cracking catalyst particles. The promoted particulate solids, if wholly or partially different in composition from the cracking catalyst particles in any way other than by the presence of the promoting metals, may be formed from any material which is suitable for circulation in an FCC system in admixture with the cracking catalyst particles. Particularly suitable materials are the porous inorganic oxides, such as alumina, silica, zirconia, titania, rare earth oxides, etc., or mixtures of two or more inorganic oxides, which may be amorphous, crystalline, or both, such as silica-alumina, natural and synthetic clays and the like, crystalline aluminosilicate zeolites, etc. Gamma-alumina is particularly useful. The ruthenium, rhodium, or iridium can be added to a particulate solid, such as catalyst particles or other particulate materials, to form a promoted particulate solid in any suitable manner, as by impregnation or ion exchange, or can be added to a precursor of a particulate solid, as, for example, by precipitation from an aqueous solution with an inorganic oxide precursor sol. The promoted particulate solids can then be formed by conventional means, such as spray drying, crushing of larger particles to the desired size, etc.

It is well known that ruthenium tends to form volatile oxides at high temperatures and in the presence of oxygen. Basic oxides such as alkaline earths or rare earths can stabilize the ruthenium by forming ruthenates, which have little tendency to volatilize. (M. Shelef and H. S. Gandhi, Plat. Met. Rev., (1974), 18, 2). U.S. Pat. No. 3,922,235 to DeLuca et. al discloses a stabilized supported ruthenium catalyst, said catalyst comprising ruthenium metals in combination with the oxide support, said support being one selected from the group consisting of zirconium titanate, and zirconium titanate mixed with titania. Such a stabilized catalyst is resistant to both ruthenium volatilization loss and ruthenium sintering.

Sintering of iridium is also well known under oxygen atmospheres at elevated temperatures. McVicker et. al taught an approach for preventing sintering and maintaining high metal dispersion of Ir/$Al_2O_3$ catalysts. (G. B. McVicker, R. L. Garten, and R. T. K. Baker, J. Catal., (1978), 54, 129). Group IIA-oxides of Ca, Sr, and Ba have been reported to stabilize the Ir surface area of Ir/Al2O3 in the presence of oxygen at elevated temperatures. Oxidative stabilization is believed to result from the formation of an immobile surface iridate via the reaction of a mobile, molecular iridium oxide species with a well-dispersed Group IIA-oxide. While the stabilization of supported ruthenium and iridium as described above is known for automotive catalysis to remove hydrocarbon and NOx pollutants, such stabilization is not believed to have been used in FCC regenerators prior to this invention. Accordingly, alumina, silica, silica-alumina, and other oxidic supports containing $TiO_2$, $ZrO_2$, alkaline earth metal oxides or lanthanide oxides can effectively be used to support, in particular, the Ru and Ir metals for regenerator $NH_3$ and HCN removal.

Particles promoted with ruthenium, rhodium, or iridium can be introduced in any convenient manner to a catalytic cracking unit. A promoted particulate solid can, for example, be physically admixed with cracking catalyst particles and the mixture can then be charged to an FCC system. The promoted particulate solids can optionally be introduced separately in the desired amount to an FCC unit already containing a substantial inventory of cracking catalyst particulates. Optionally, the complete inventory of particulate solids can be promoted with ruthenium, rhodium, or iridium. It is to be understood that the particles promoted with Ru, Rh, or Ir can be introduced initially into the regeneration unit and, if desired, remain in the regenerator unit or separated from the cracking catalyst such that the Ru, Rh, or Ir promoted particulates do not circulate with the cracking catalyst during catalytic cracking.

In general, the precious metal, Ru, Rh, or Ir, or mixtures thereof, will be present in the additive in amounts ranging from about 50-2000 ppm. Examples ranging from 100-1,000 ppm and 300-700 ppm may be more typical and may depend upon the particular hydrocarbon feedstock which is being cracked in the FCC unit.

The $NH_3$ and HCN reduction composition of this invention may contain minor amounts of other materials, which preferably do not adversely affect the ammonia decomposition or HCN decomposition in a significant way. The additive composition of the invention may be combined with fillers (e.g., clay, silica-alumina, silica and/or alumina particles) and/or binders (e.g., silica salt, alumina salt, silica-alumina salt, etc.) to form particles suitable for use in an FCC process, preferably by spray drying before any calcination step. More preferably, porous particles, also known as microspheres, are formed from the oxidic support typically by spray drying powdered oxide support materials combined with a binder/filler before or after impregnation with the precious metal component. Preferably, any added binders or fillers used do not significantly adversely affect the performance of the precious metal in decomposing the ammonia or HCN gaseous components in the regenerator. The additive particles are typically of a size suitable for circulation with the cracking catalyst inventory in an FCC process, but can be made larger for separation from the cracking catalyst. The additives preferably have an average particle size of about 20-200 microns. The additive particles preferably have attrition characteristics such that the particles can withstand the severe environments of the FCC unit.

It is possible that the $NH_3$ and HCN reduction additive of the invention be incorporated into the FCC catalyst particles themselves. In such case, any conventional FCC catalyst particle components may be used in combination with the $NH_3$ and HCN reduction composition of the invention. If integrated into the FCC catalyst particles, the $NH_3$ and HCN reduction additive of the invention preferably represents at least about 0.1-10 ppm of Rh, Ru and/or Ir in the entire catalyst inventory.

While the invention is not limited to any particular method of manufacture, the $NH_3$ and HCN reduction additive of the invention is preferably made by impregnating oxidic support particles with a ruthenium, rhodium, or iridium salt and wherein the impregnated oxidic support is then calcined in air. In such case, the ruthenium, rhodium, or iridium species would be in the form of an oxide at least in part. The sources of the precious metals are preferably slurries, salts, and/or solutions of the metal oxides themselves or salts of the respective metals which decompose to oxides on calcination. The calcination step is preferably performed at about 100-750° C., more preferably at about 300-600° C.

Where the $NH_3$ and HCN reduction additive of the invention is integrated into an FCC catalyst particle, preferably the additive composition is first formed and then combined with the other constituents which make up the FCC catalyst particle. Incorporation of the $NH_3$ and HCN reduction additive directly into FCC catalyst particles may be accomplished by any known technique. Examples of suitable techniques for this purpose are disclosed in U.S. Pat. Nos. 3,957,689; 4,499,197; 4,542,188; and 4,458,623, the disclosures of which are incorporated herein by reference.

The following examples illustrate the operation of the present invention and show the ability of Ru, Rh, and Ir to remove ammonia and HCN.

EXAMPLE 1

Rhodium is impregnated onto alumina support particles to a level of 500 ppm from an aqueous solution of rhodium nitrate. The dried material is calcined at 500° C. for 2 h.

EXAMPLE 2

Ruthenium is impregnated onto alumina support particles to a level of 500 ppm from an aqueous solution of ruthenium chloride. The dried material is calcined at 500° C. for 2 h.

EXAMPLE 3

Alumina support particles are impregnated with titanium (IV) isopropoxide, followed by the addition of water to hydrolyze the titanium isopropoxide. The particles are then filtered, washed, dried, and calcined at 500° C. for 2 h. The product contains 10% $TiO_2$ by weight.

EXAMPLE 4

Ruthenium is impregnated onto the product made in Example 3 to a level of 500 ppm from an aqueous solution of ruthenium chloride. The dried material is calcined at 500° C. for 2 h.

EXAMPLE 5

Iridium is impregnated onto alumina support particles to a level of 500 ppm from an aqueous solution of iridium chloride. The dried material is calcined at 500° C. for 2 h.

EXAMPLE 6

Alumina support particles are impregnated with an aqueous solution of barium acetate, dried, and calcined at 649° C. for 2 h. The product contains 10% BaO by weight.

EXAMPLE 7

Iridium is impregnated onto the product made in Example 6 to a level of 500 ppm from an aqueous solution of iridium chloride. The dried material is calcined at 593° C. for 2 h.

COMPARATIVE EXAMPLE A

Platinum is impregnated onto alumina support particles to a level of 500 ppm from an aqueous solution of a monoethanol amine complex. The dried material is calcined at 500° C. for 2 h.

COMPARATIVE EXAMPLE B

Palladium is impregnated onto alumina support particles to a level of 500 ppm from an aqueous solution of palladium nitrate. The dried material is calcined at 500° C. for 2 h.

EXAMPLE 8

Ammonia Decomposition Testing—Experiments were carried out with a fixed bed reactor using the following gas composition: 450 ppm $NH_3$, 15% steam, 2%-6% CO, and Ar as balance. A total gas flow rate of 260 cc/min (STP), GHSV (39,000 h−1) was used which would be similar to that experienced by the additive in a commercial FCC regenerator. A 0.4 g precious metal on alumina sample was used as the $NH_3$ reducing additive along with 1.6 g of a kaolin microsphere as an inert diluent. Activity data for $NH_3$ decomposition at different CO concentrations using 500 ppm alumina-supported precious metals are shown in Table 1 below. It was found that the supported Ru, Rh, and Ir were very active for $NH_3$ decomposition; whereas Pt and Pd had no activity at 700° C. in the presence of 15% steam and 2-6% CO.

TABLE 1

| | % Conversion of NH₃ | | |
| --- | --- | --- | --- |
| | CO Concentration | | |
| Sample | 2% | 4% | 6% |
| Comparative A | 0 | / | / |
| Comparative B | 0 | / | / |
| Example 1 | 100% | 90% | 75% |
| Example 2 | 100% | 100% | 100% |
| Example 5 | 32% | — | — |

EXAMPLE 9

HCN Removal Testing—Similar experiments to NH₃ decomposition were carried out with the replacement of NH₃ by 450 ppm HCN. Interestingly, HCN behaved similarly to NH₃ over the precious metal catalysts. As shown in Table 2, Pt had no activity for HCN removal, and Ru gave 100% HCN conversion (to N₂). Once again, Rh was slightly less active compared to Ru.

TABLE 2

| | % Conversion of HCN | | |
| --- | --- | --- | --- |
| | CO Concentration | | |
| Sample | 2% | 4% | 6% |
| Comparative A | 0 | 0 | / |
| Example 1 | 100% | 87% | 70% |
| Example 2 | 100% | 100% | 100% |

What is claimed is:

1. In a process for cracking hydrocarbons in a cracking system employing an inventory of cracking catalyst particles, said inventory being cycled between a cracking zone wherein said hydrocarbons are cracked in contact with said catalyst particles and coke is formed on said catalyst particles at cracking conditions, and a catalyst regeneration zone wherein said coke is burned off said catalyst particles with oxygen, said catalyst regeneration zone being operated in a partial mode of combustion wherein a flue gas from said regeneration zone contains from about 1-10 volume % CO and NH₃ and HCN, the improvement comprising reducing the NH₃ and HCN in said flue gas by including with the inventory of cracking catalyst particles in said regeneration zone precious metals selected from the group consisting of ruthenium, rhodium, and mixtures thereof, wherein said precious metal is stabilized with titania, zirconia, alkaline earth metal oxide, lanthanide oxide, or mixtures thereof, and wherein said precious metals are contained on a particulate support and wherein said precious metals are present on said particulate support in amounts ranging from 50-2000 ppm.

2. The improvement of claim 1 wherein said particulate support is separate from said cracking catalyst particles.

3. The improvement of claim 2 wherein said particulate supported precious metals circulate between the regeneration zone and the cracking zone.

4. The improvement of claim 2 wherein said particulate supported precious metals remain in said regeneration zone.

5. The improvement of claim 1 wherein said precious metals are supported on said cracking catalyst particles.

6. The improvement of claim 1 wherein said precious metals are present on said particulate support in amounts ranging from 100-1,000 ppm.

7. The improvement of claim 6 wherein said precious metals are present is said particulate support in amounts ranging from 300-700 ppm.

8. The improvement of claim 1 wherein NH3 and HCN are converted to nitrogen in the presence of said precious metals.

9. The improvement of claim 2 wherein said precious metals are supported on particulate alumina or silica-alumina.

10. The improvement of claim 1 wherein said precious metal is ruthenium.

11. The improvement of claim 1 wherein said precious metals are present in the form of their respective oxides.

12. The improvement of claim 1 wherein said precious metals are present in the form of their respective oxides.

13. The improvement of claim 9 wherein said precious metals are present in the form of their respective oxides.

14. The improvement of claim 1 wherein said precious metals are present in the free metal form.

15. The improvement of claim 1 wherein said precious metals are present in the free metal form.

16. The improvement of claim 9 wherein said precious metals are present in the free metal form.

17. The improvement of claim 1 wherein carbon monoxide is present in said regeneration zone flue gas in amounts from 2-6 volume %.

18. The improvement of claim 1 wherein said cracking catalyst particles comprise a zeolite.

* * * * *